Patented July 20, 1926.

1,593,232

UNITED STATES PATENT OFFICE.

FRANCIS T. WHITWORTH, OF GARFIELD, UTAH.

ART OF CONCENTRATION OF MINERAL ORES BY FLOTATION.

No Drawing.    Application filed November 2, 1925. Serial No. 66,420.

This invention relates to the concentration of mineral ores by the flotation process and the object of the invention is to provide for effective and economical flotation by the use of certain flotation reagents hereinafter described.

It has been proposed to prepare flotation reagents by heating various organic substances with sulphur. This process is known as "reconstruction." One of the principal objects of this invention is to provide an improved sulphur-containing reagent and method of making and using the same.

Other objects and advantages will hereinafter appear.

I have found that much superior results are obtained by heating various organic substances containing oxygen with sulphur and phosphorus. The sulphur and the phosphorus may conveniently be combined before the treatment of the organic material is commenced. If free phosphorus is used, however, the red form should be used as the yellow reacts with extreme violence.

It appears that the reasons for the superiority of sulphur and phosphorus over sulphur alone are; first, that more of the sulphur is chemically combined with the organic compound as distinguished from mere solution, and in the second place, more efficient sulphur compounds are formed.

Thus when organic substances such as phenol, cresylic acid, pine oil or the like are heated with sulphur, a certain amount of organic sulphide compounds R—S or R—S$_2$ are formed, although probably the greater part of the sulphur is present in solution. In addition to the sulphide compounds, very small amounts of sulph-hydrate (R—SH) compounds are formed.

When, however, phosphorus is used, which will combine with the oxygen of the hydroxyl or other group of the organic substance, not only is a much larger proportion of sulphur brought into chemical combination but also a far larger proportion of sulph-hydrate is formed which by decomposition and polymerization gives a very complex mixture of thio-compounds.

The preferable phosphorus compound to use is phosphorus pentasulphide due to its large proportion of available sulphur and relatively high acidic properties compared with other sulphur-phosphorus compounds. The materials used must be free from water to enable the proper reactions to take place. If the cresylic acid or other organic material contains even one or two per cent of water the water decomposes the phosphorus pentasulphide, according to the following equation:

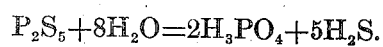
$$P_2S_5 + 8H_2O = 2H_3PO_4 + 5H_2S.$$

In preparing my reagent I may use as an organic material almost any compound containing a hydroxyl group such as the aliphatic alcohols or aromatic hydroxyl derivatives, such as phenol, cresol, xylenol, or naphthol. In addition, although I prefer compounds having a hydroxyl group, I may use compounds containing a carboxyl group (—COOH), aldehyde group (—CHO), and the ketone group (—CO). The latter compounds, especially the two last, tend to form organic sulphides completely in place of mixtures and hence are not ordinarily as desirable as the hydroxyl compounds, which tend to form larger proportions of sulphhydrate compounds and resultant complex decomposition and polymerization products.

It will also be understood that many products, especially those obtained by the destructive distillation of coal (coal tar distillates) and of wood and the by-products thereof, contain compounds such as those above mentioned and may therefore be reconstructed in accordance with this invention.

The preferred materials are cresol or cresylic acid and phosphorus pentasulphide. The amount of phosphorus pentasulphide which may be caused to react may be as much as 40% or more of the weight of cresylic acid, but I have found that the proportion of phosphorus pentasulphide which it is best to use depends upon the nature of the circuit in which the reagent is to be used. Thus best results were obtained with the following proportions:

20% phosphorus pentasulphide for preparing a product for use in acid pulp.

10% phosphorus pentasulphide for preparing a product for use in neutral pulp.

30% phosphorus pentasulphide for preparing a product for use in alkaline pulp.

When the reconstructed cresylic acid is to be used in acid circuit, advantageous results are obtained by adding a small amount, say 0.5% of sodium hydroxide or other alkali to the mixture before reconstruction.

The materials are mixed and heated to 180° C. when the product is to be used for flotation in an acid circuit, to give the necessary body to the oil for acid conditions; if the product is to be used for flotation in alkaline circuit the mixed materials are heated to 140° C. As cresylic acid boils at about 190° C. the reaction may be carried out at atmospheric pressure, with a reflux condenser to catch any vapors which might otherwise be carried off. For substances of lower boiling point it may be necessary to heat in a closed still under pressure in order to prevent loss of reagents. The reaction is substantially complete in an hour but further heating is not ordinarily harmful unless continued for three hours or more. At the end of the treatment the supernatant liquor, constituting the floation reagent is drawn off from the still leaving the sludge behind.

The apparatus in which the reconstruction may be carried out and in which the ore is subjected to flotation treatment are so well-known that no illustration of such apparatus is given.

My improved reagents as distinguished from xanthates and other sulphur containing materials, possess frothing as well as collecting ability so that it is not essential to add other oils or frothing agents although such additions may be desirable in certain cases. This is particularly true of substances which before reconstruction have only a slight frothing capacity.

Good results have been obtained with from 0.4 to 0.1 pounds of the product produced as above described per ton of ore.

I have found that my improved reagents, especially reconstructed cresylic acid or cresol, float certain sulphides such as chalcocite very well but inhibit the flotation of pyrite so that a higher grade of concentrate of the desired metal such as copper may be obtained than is otherwise possible.

For purposes of illustration I give in detail the results of practice with a process and apparatus of the mechanical agitation type using ore of the Utah Copper Company containing 0.771 per cent copper combined chiefly as sulphides.

The flotation agent used consisted of the product of reconstructing cresylic acid by heating it with ten per cent solid phosphorus pentasulphide to 140° C. for two hours under a reflux condenser.

Tests were made in acid, neutral and alkaline circuit, and using both the reconstructed product and untreated cresylic acid for comparison. For the acid pulp 5 pounds of 60° Bé. sulphuric acid per ton of dry ore were added. For the alkaline circuit 2 pounds of caustic soda per ton of dry ore were used. In each case the amount of flotation agent used, whether untreated cresylic acid or the reconstructed product thereof, was 0.4 lbs. per ton of dry ore.

The results were as follows:

| Circuit | Tailing per cent copper | | |
|---|---|---|---|
|  | Acid | Neutral | Alkaline |
| Untreated cresylic acid | .512 | .238 | .251 |
| Reconstructed cresylic acid | .080 | .089 | .072 |

Using 0.6 pounds of the product obtained by reconstructing cresylic acid by heating it with 5% sulphur and 0.5% sodium hydroxide, the following results were obtained:

| Circuit | Per cent copper | | |
|---|---|---|---|
|  | Acid | Neutral | Alkaline |
| Heading | .774 | .774 | .879 |
| Tailing | .098 | .133 | .182 |

From the above figures it will be seen that when cresylic acid is reconstructed with phosphorus pentasulphide the most efficient results are with an alkaline circuit whereas the reverse is true of cresylic acid reconstructed with sulphur.

Alkaline conditions are also favorable to selective flotation of chalcocite and chalcopyrite, with respect to pyrite. Thus in an alkaline circuit, using the cresol reconstructed with phosphorus pentasulphide only about 48% of the iron is floated while 88% of the copper may be recovered. This difference would be greater but for the iron contained in the chalcopyrite which was floated.

An alkaline circuit is preferable to an acid circuit on account of the fact that in the presence of acid the copper sulphate present corrodes the impellers of the aeration cells and other parts unless rubber covered.

Reconstructed cresylic acid is mentioned as the preferred reagent as it has proved the best on the ore tested but as is well known to those skilled in the art the particular reagent used as well as its amount and method of use vary somewhat according to the nature of the ore treated. The method of treating the organic material with phosphorus pentasulphide is in any case, however, substantially the same as above described, but it will of course be evident that the preferred proportion by weight of phosphorus pentasulphide will depend on the material to be reconstructed. In some cases, instead of using phosphorus pentasulphide in the reconstruction process, corresponding amounts of sulphur and red phosphorus may be used.

In general, for successful flotation of metalliferous particles, a definite condition of acidity or alkalinity must be maintained in the ore pulp. This is due to the fact that the reagent in use requires such a conditioned pulp to function in the desired manner. However, if cresylic acid is treated with phosphorus pentasulphide, a complex mixture of cresyl sulphides, disulphides, sulph-hydrates and polymerized thio compounds results which if mixed with ore pulp will select and float metalliferous particles in acid, neutral or alkaline conditions. Thus for general flotation purposes, the necessity of pulp conditioning is eliminated.

I have found that the type and amount of froth desired may be obtained by changing the time and temperature of the reconstruction. The reagents may also be altered to a marked degree by pressure heating and the use of small quantities of oxidizing or reducing agents.

I am aware that the proportions and nature of the ingredients used in making my improved reagents, their methods of manufacture and use may be varied through a wide range without departing from the principles of my invention. Moreover the improvement in the art of flotation above described includes the use of the reaction products produced by the reaction of oxygen-containing organic substances together with suphur and phosphorus under the conditions stated irrespective of the actual nature of the chemical compounds which may be produced by such reaction.

I claim:—

1. The method of effecting the concentration of minerals by flotation which comprises adding to the mineral pulp a modifying agent consisting of the reaction product of an organic compound together with sulphur and phosphorus, and subjecting the resulting mixture to a flotation operation.

2. The method of effecting concentration of minerals by flotation which comprises adding to the mineral pulp a modifying agent consisting of the reaction product of an aromatic organic oxygen containing compound together with sulphur and phosphorus, and subjecting the resulting mixture to a flotation operation.

3. The method of effecting concentration of minerals by flotation which comprises adding to the mineral pulp a modifying agent consisting of the reaction product produced by heating an aromatic organic oxygen containing compound in the presence of material containing sulphur and phosphorus and subjecting the mineral pulp to which said modifying agent has been added to a flotation operation.

4. The method of effecting concentration of minerals by flotation which comprises adding to the mineral pulp a modifying agent consisting of the product produced by subjecting an aromatic organic compound containing a hydroxyl group to the action of heat in the presence of material containing sulphur and phosphorus and subjecting the mineral pulp containing such modifying agent to a flotation operation.

5. The method of effecting concentration of minerals by flotation which comprises adding to the mineral pulp a modifying agent consisting of a product consisting of cresol which has been subjected to heat in the presence of sulphur and phosphorus and subjecting the mineral pulp and modifying agent to a flotation operation.

6. The method of effecting concentration of minerals by flotation which comprises adding to the mineral pulp a modifying agent consisting of a product produced by heating an oxygen-containing organic compound together with a compound of phosphorus and sulphur, and subjecting the mineral pulp and modifying agent to a flotation operation.

7. A method as set forth in claim 5 in which the said sulphur and phosphorus compounds consist of phosphorus pentasulphide.

8. A method as set forth in claim 5 in which the said compound of sulphur and phosphorus consists of phosphorus pentasulphide in the proportion of 10% to 30% of the weight of cresol used.

9. The method of effecting concentration of minerals by flotation which comprises adding to the mineral pulp a reaction product of an oxygen-containing organic compound together with sulphur and phosphorus, and subjecting the resulting mixture to a flotation operation.

10. The method of effecting concentration of minerals by flotation which comprises adding to the mineral pulp a modifying agent consisting of an oxygen-containing aromatic compound reconstructed by the reaction therewith of a compound containing sulphur and phosphorus and subjecting the resulting mixture to a flotation operation.

11. The method of effecting concentration of minerals by flotation which comprises adding to the mineral pulp a product produced by the reaction of cresol and phosphorus pentasulphide and subjecting the resulting mixture to a flotation operation.

12. The method of effecting concentration of minerals by flotation which comprises adding to the mineral pulp a modifying agent including an oxygen-containing aromatic organic group together with sulphur and phosphorus in combined form and subjecting the resulting mixture to a flotation operation.

In testimony whereof I have hereunto subscribed my name this 21st day of October 1925.

FRANCIS T. WHITWORTH.